(12) United States Patent
Teodorescu-Badia et al.

(10) Patent No.: US 10,395,175 B1
(45) Date of Patent: Aug. 27, 2019

(54) DETERMINATION AND PRESENTMENT OF RELATIONSHIPS IN CONTENT

(71) Applicant: Amazon Technologies, Inc., Seattle, WA (US)

(72) Inventors: Julie Lynne Teodorescu-Badia, Redmond, WA (US); Walter Manching Tseng, Bellevue, WA (US); Abhishek Patnia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 794 days.

(21) Appl. No.: 14/568,940

(22) Filed: Dec. 12, 2014

(51) Int. Cl.
G06N 5/04 (2006.01)
G06N 20/00 (2019.01)

(52) U.S. Cl.
CPC .............. *G06N 5/04* (2013.01); *G06N 20/00* (2019.01)

(58) Field of Classification Search
CPC ........ G06N 5/022; G06N 5/04; G06N 99/005; G06F 17/30598; G06F 3/04842; G06F 17/28; G06F 17/30864; G06F 17/2705; G06F 17/30684; G06F 17/277; G06F 17/2785; G06F 17/30867; G06F 17/30876; G06F 17/30
See application file for complete search history.

(56) References Cited

U.S. PATENT DOCUMENTS

| | | | | |
|---|---|---|---|---|
| 5,745,889 A * | 4/1998 | Burrows | ............ | G06F 17/30622 |
| 7,797,328 B2 * | 9/2010 | Styles | ............... | G06F 17/30684 |
| | | | | 707/758 |
| 2009/0063157 A1 * | 3/2009 | Seo | .......... | G06F 17/27 |
| | | | | 704/270 |
| 2012/0137246 A1 * | 5/2012 | Pyo | ...... | G06F 17/2235 |
| | | | | 715/776 |
| 2012/0143881 A1 * | 6/2012 | Baker | ............... | G06F 17/30011 |
| | | | | 707/750 |
| 2012/0171653 A1 * | 7/2012 | Kwon | ..................... | G09B 5/062 |
| | | | | 434/317 |
| 2012/0210203 A1 * | 8/2012 | Kandekar | ......... | G06F 17/30719 |
| | | | | 715/230 |
| 2013/0080881 A1 * | 3/2013 | Goodspeed | ............. | G06F 17/21 |
| | | | | 715/251 |
| 2013/0103667 A1 * | 4/2013 | Minh | ....................... | H04L 51/32 |
| | | | | 707/709 |
| 2013/0311870 A1 * | 11/2013 | Worsley | ............ | G06F 17/30952 |
| | | | | 715/234 |
| 2014/0089239 A1 * | 3/2014 | Hu | ...................... | G06F 17/30029 |
| | | | | 706/12 |
| 2015/0046152 A1 * | 2/2015 | Lee | .................... | G06F 17/30705 |
| | | | | 704/9 |
| 2015/0348157 A1 * | 12/2015 | Garcia | ............... | G06Q 30/0625 |
| | | | | 705/26.62 |
| 2016/0048517 A1 * | 2/2016 | Jensen | ................ | G06F 17/3053 |
| | | | | 707/749 |

* cited by examiner

Primary Examiner — Scott A. Waldron
Assistant Examiner — Oluwatosin O Alabi
(74) Attorney, Agent, or Firm — Eversheds Sutherland (US) LLP

(57) ABSTRACT

Certain embodiments herein relate to dynamically displaying related information based on a current location in content. Various types of content may include characters in a story, places, events, or other objects. Relationships associated with these objects may be determined, along with a location in the content at which the relationships exist. Such information may facilitate presentation of the relationships by a reader device based on a current location in the content displayed by the reader device.

20 Claims, 9 Drawing Sheets

DETERMINATION AND PRESENTMENT OF RELATIONSHIPS IN CONTENT

BACKGROUND

Users of electronic books ("eBooks") or similar devices are increasingly accessing content, such as text, video, graphics, etc. The content may include various types of visual aids or reference material that may enhance a user's understanding of the content. For example, these visual aids may summarize or organize information in content for the benefit of users. Presentation of the visual aids or references may be problematic, however, because they may not be dynamically updated as content changes. They may instead be static information that may unfortunately either become out-of-date as a user progresses through content, or may spoil future events in the content for users, neither of which are desirable.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
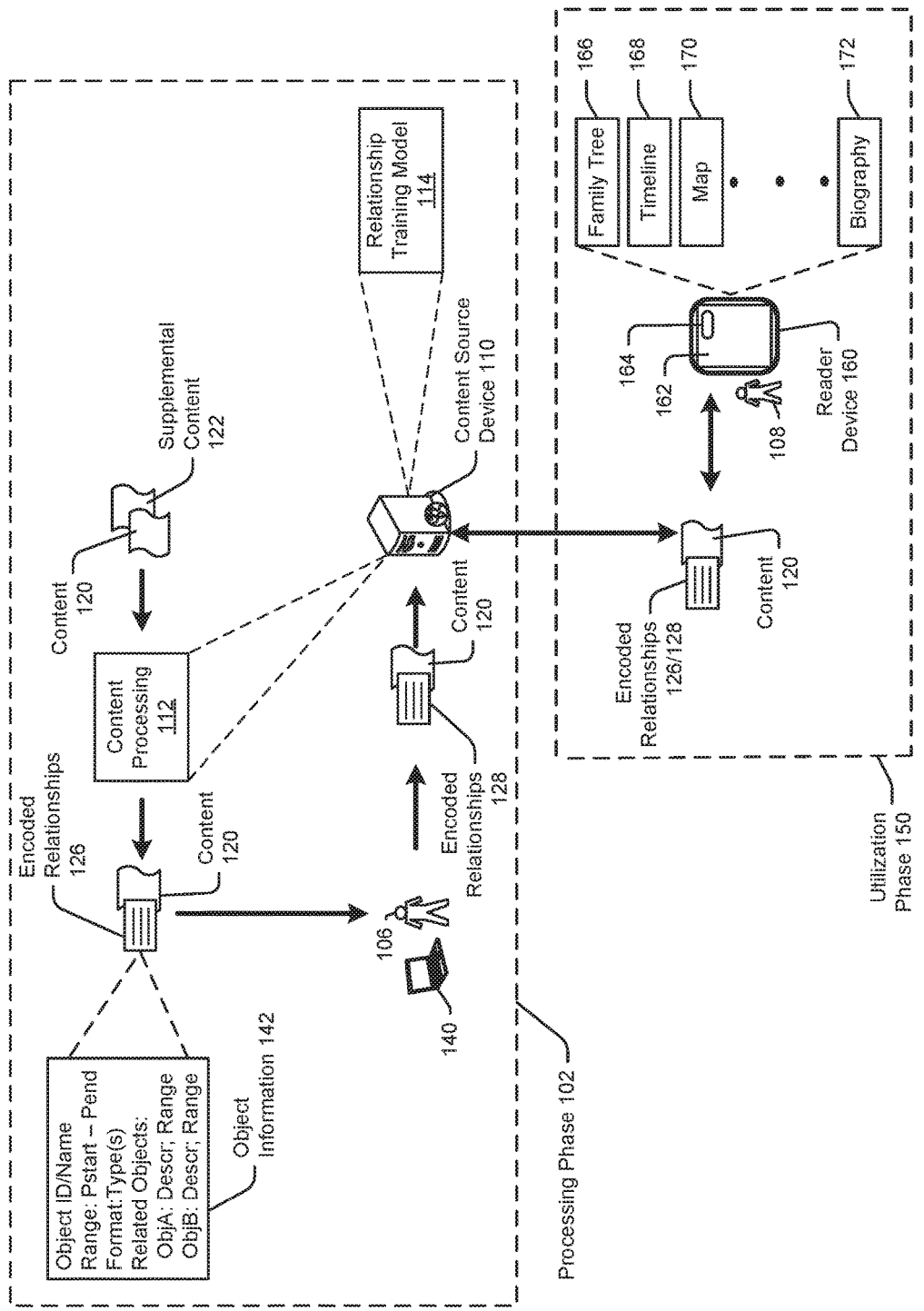
FIG. 1 illustrates a schematic diagram of example processes for determining and presenting related information based on a location in content, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, dynamically displaying related information based on a current location in content, such as books, videos, audio, etc. Such content may include various characters, places, events, or other objects. In certain embodiments herein, relationships associated with these objects may be determined using certain criteria, along with a location in the content at which the relationship exists. A layout, format, or information structure for associating the relationships, such as a family tree, a timeline, a map, a biography, etc., may also be determined for presenting the relationships. The relationship may be further scored based on certain criteria and compared to a threshold to determine the probability that the relationship is valid. Relationships determined by computer systems herein may be reviewed by a user of the content, such as an author of the content or a user who accesses the content on a reader device, to modify information associated with the relationships. Such modifications may increase the score or likelihood that the relationship is valid.

Information associated with valid relationships, such as an identification of the object (e.g., a character in a story), an identification of a related object (e.g., a related character in the story), a location in the content of the relationship, and a type of format for presenting the relationship, among other information, may be stored in association with the content and distributed to a reader device where the content and the relationships may be viewed.

A reader device may present the content, and when requested, may present relationship information based on a current location in the content. The current location in the content may be compared to locations in the relationship information, along with an identification of relevant objects and formats in the relationship information, to facilitate presenting relevant relationships to a user 108 of the reader device. A relevant relationship may be a relationship that corresponds to the current location in the content displayed by the reader device (e.g., the current page in a book). Relationships beyond the current location in the content may not be displayed to prevent spoiling future events that have not yet been displayed by the reader device. A relevant relationship may also mean that the presented relationship information is up-to-date. In other words, as relationships change, they may be dynamically updated and presented to the user 108 consistent with the user's progression through the content.

The above descriptions are for purposes of illustration and are not meant to be limiting. More detailed descriptions and examples are provided below.

FIG. 1 illustrates a schematic diagram of example processes for determining and presenting related information based on a location in content, according to an embodiment of the disclosure. The example processes may include a processing phase 102 in which relationships between objects may be identified and encoded, and a utilization phase 150 in which the encoded relationships may be utilized by a reader device 160. As used herein, an object may refer to various entities in content, such as characters, persons, places, events, actions, or other things. Relationships or links between such objects may be determined and updated according to changes in the content, numerous examples of which are provided below.

The content 120, which may include text in a book, scenes in a video, other textual or graphical illustrations, streams of information, etc., may be analyzed to determine objects and relationships between these objects. In one embodiment, supplemental content 122 may be used to identify objects in the content 120. Example supplemental content 122 may include references, such as marketing information, user reviews, factual information, etc. For example, a press release about an action performed by a character in the content 120 may be analyzed to determine a date on which the character performed the action. The date may be used to place the action on a timeline of actions associated with the character. As another example, user comments or reviews about characters in a story may be analyzed to determine a relationship between characters, such as a husband and a wife. In other examples, the supplemental content 122 may include a list of objects (e.g., characters) that exist in the content 120.

Supplemental content 122 may further include indications of relationships between objects in a story. In one embodiment, such indications of relationships may be provided by an author (e.g., the user 106) of the content 120. The relationships, which may be relationships between characters in a story, events on a timeline, territories in a country, etc., may be specified in a format such as the object information 142, which will be described in greater detail below. Other formats for presenting relationship information in the supplemental content 122 may also be used to facilitate generating the object information 142 or another suitable format for presenting relationship information.

The determination of relationships between objects may be performed by the content source device 110, in one embodiment. The content processing function 112 may perform functions related to the determination. In one embodiment, the content processing function 112 may implement one or more algorithms to determine the relationships. An example algorithm may use a set of one or more classifiers to identify objects within the content 120. As used herein, a classifier may refer to a rule, construct, or generally an approach for classifying portions (e.g., parts of speech) of a sentence to facilitate determining actors (e.g., characters), actions (e.g., events), and objects (e.g., related characters) of the sentence, among other things.

A classifier may include context clues or keywords that may facilitate determining events in the content 120. The keywords may correspond to certain events that occur in the content 120, in one embodiment. Example keywords may include, but are not limited to, "married," "wedding," "divorce," "birth," "born," "death," or similar terms. Upon identifying these terms in the content 120, objects (e.g., characters) that meet certain criteria (e.g., proximity to the event, etc.) may be determined to be related to an event. For example, the sentence "John married Martha" may be analyzed to determine that John married Martha, where the objects John and Martha may be related in a manner indicating their marriage event. Numerous other examples exist, some of which are described in greater detail in FIGS. 3A-3E.

The location at which a relationship between objects is identified may be stored. In one embodiment, such a location may be identified by a position of one or more words in the content 120 that describe the relationship. Each word in content 120 that is a book, for example, may be identified by its own unique position. In one embodiment, the unique position may be a number assigned to each word in the content 120 in ascending order from the first word to the last word. The positions of words describing a relationship may indicate the location of the relationship, in one embodiment. For example, in the sentence "John married Martha," a position of one-hundred (P100) may be assigned to "John," one-hundred one (P101) to "married," and one-hundred three (P103) to "Martha." A position range of P100 to P103 may therefore be assigned to John's marriage to Martha in the above example.

If "John divorces Martha" at position ranges five-hundred (P500) to five-hundred three (P503), then a position range of P500 to P503 may be stored for the divorce. A reader device 160 displaying the content 120 may present the change in relationship (e.g., the divorce) to a user who is currently viewing content beyond position P503. The marriage, no longer relevant in the present example, may therefore be replaced by information related to the divorce.

A type of format or information structure may also be determined during content processing 112. Example formats may include, but are not limited to, a family structure 166 (e.g., family tree), a timeline 168, a map 170, and a biography 172. In one embodiment, the type of format may be based on a classifier. Certain types of classifiers may relate to certain types of formats. In one embodiment, a context clue or keyword associated with a classifier may be used. For example, a keyword "married," or similar term that implies a familial relationship, may be related to a family tree format. Other examples exist for each type of format, information structure, or technique for associating relationship information.

A score may also be determined during content processing 112. The score may indicate a likelihood that a relationship between objects was correctly identified at a particular location in the content 120. Factors that may be used to determine the score include, but are not limited to, proximity between the objects in the content 120, the number of references to the relationship in the content 120, and the existence and number of events that corroborate the relationship. Proximity between objects may refer to the number of words in content that are between objects. For example, in the present example of "John married Martha," John is only one word from the event "married," which may suggest a relatively high likelihood that John is married. In some embodiments, the score may be based on a predetermined number of words between objects. For example, ten words or less between objects may be indicative of a relationship between the objects, and a score may reflect the existence of such a relationship. Any predetermined number of words between objects may be used to determine a suitable score indicative of a relationship in other examples.

As mentioned, the number of events that corroborate the existence of a relationship may also impact a score for a relationship. For example, in the present example of "John married Martha," text that occurs later in the content 120 that reads "Mrs. Martha" (e.g., "Mrs.") may corroborate that Martha is married. In such instances, a higher score or probability that a marriage relationship exists between John and Martha may be determined. Numerous other examples and criteria exist, some of which are described in greater detail below.

Content 120 that is analyzed during content processing 112 may result in content 120 that includes encoded relationships 126, as shown. In one embodiment, the encoded relationships 126 may include various information related to objects in the content 120. In one embodiment, each object in the content 120 may have one or more encoded relationship components that may store relationships related to the content. Example relationship information is shown in the object information 142. In one embodiment, the object information 142 may include name-value pairs, while it may include delimited text to facilitate parsing relationship information (e.g., by the reader device 160). The object information 142 may also be referred to as a structure, object structure, or a similar term herein. Other formats for storing related information between objects and events may exist in other examples. For example, data that represents a family structure or family tree may be stored in the object information 142. Such data may indicate relationships between members of a family such as, but not limited to, a parent-to-child, sibling-to-sibling, grandparent-to-grandchild, or any number of other familial relationships.

As shown, an object, such as a character, event, place, etc., may have a unique name or identification (shown as "Object ID/Name"). Example object identifications may be the name of a character in a story, the name of a region or area, etc. A range that is relevant to the object ID (shown as "Range") may also exist, as shown. The range may have a starting position ($P_{start}$) and an ending position ($P_{end}$). The range may indicate one or more portions in the content 120 that are relevant to the named object. For example, a character who exists from position P001 to position P10,500 in a story with an ending position P20,500 may be relevant in the story only through position P10,500.

A format type or information structure type may also be indicated in the object information 142. The format type may indicate a type of format for associating relationship information. Example format types include, but are not limited to, a family structure or family tree 166, a timeline 168, a map 170, and a biography 172. A reader device may access the format type field in the object information 142 to determine which format type to use for displaying relationship information, as will be described in greater detail below.

The object information 142 may also include information associated with related objects. A section (referred to as "Related Objects") may exist in the object information 142 as shown. In one example, a related object may be a character in a story, and the related character may be the wife of another character. The marriage may only for a certain range (e.g., P300-P8,000), after which the characters may divorce.

In another example, an object may be a region or country, and related objects may be states or territories within the country. In this example, the Object ID/Name field may indicate the name of the country (e.g., "CountryA"), while a related objected may be identified as "AreaX," and may be described as "located in southern part of Country A." A range may exist (e.g., P1,100 to P3,000) to indicate the portion of the content 120 over which the relationship between AreaX and CountryA exists. AreaX may be sold to another country after position P3000, for example, and therefore may no longer be associated with CountryA.

In another example, an object may be a character in a story, and a related object may be a time at which an event occurred with respect to the character. Such relationships may be displayed along a timeline, in one embodiment. For example, enrollment into a university by a character in 1850 may be described as "CharacterA enrolled in UniversityX" on the timeline for time 1850. Such a relationship between the time and CharacterA may exist over a certain range, as shown and described above.

A score for the relationships, as described above, may also be stored in the object information 142. The score may be compared to a threshold value to determine whether, for example, the relationship information should be included in the object information 142. In this way, the reader device 160 may not display the relationship information when it is not associated with the content 120. In another embodiment, the reader device 160 may receive the relationship information but may not present the relationship information if it is below a certain threshold. Determination of the relationship score will be described in greater detail below.

The object information 142 may be associated with the content 120. In one embodiment, the encoded relationships 126, in which the object information 142 may be embedded, may be attached to the content 120. One or more sidecar files may be used to implement such attachment or other association between the encoded relationships 126 and the content 120, in one embodiment. Metadata tags or other association techniques may be used to associate the encoded relationships 126, and hence the object information 142, with the content 120 in other embodiments. The encoded relationships 126 are depicted as overlapping a portion of content 120 to signify an attachment or otherwise an association between such information. By way of such association, the object information 142 may be distributed along with the content 120 to the reader device 160, in one embodiment.

In certain embodiments herein, the encoded relationships 126 may be modified by a third party user, such as an author of the content 120. In one embodiment, the user 106 may access the content 120 and the encoded relationships 126 with a user device 140, and may determine whether the encoded relationships 126 require correction. For example, if the encoded relationships 126 incorrectly indicate that John first married Martha at the occurrence of the text "Mrs. Martha" in the above example, then the user 106 may modify the encoded relationships 126 to indicate that John married Martha at position range P100 to P103, as described above. Errors in the encoded relationships 126 may be corrected in such fashion to generate modified encoded relationships 128 of the content 120, as shown.

In some embodiments, therefore, determining relationships between objects in content may include implementation of the content processing function 112 by the content source device 110, and may further include review by a user 106 to verify that the relationship information is consistent with the content 120.

Certain embodiments herein may also relate to modeling relationships between objects. A relationship training model 114 may utilize parameters, rules, criteria, classifiers, or factors to control the operation of one or more algorithms implemented by the content processing function 112 to determine relationships between objects in content. In one embodiment, the relationship training model 114 may modify factors based on updates received from reviewers of content and presumed relationships in the content determined by the content processing function 112.

The relationship training model 114 may begin with an initial bias. In one embodiment, the initial bias may indicate a relatively low probability that relationships between objects in content are accurate. The bias for each relationship may be adjusted based on the updates received from the reviewers of the content. For example, if the updates indicate that the presumed relationship information is accurate, then the bias for the relationship may be adjusted to reflect a greater confidence in the relationship training model 114. If the updates indicate that the presumed relationship information is inaccurate, then the bias for the relationship may be adjusted to reflect a reduced confidence in the relationship training model 114.

In one example, a score for a certain relationship between objects may be 0.5. If a reviewer of the relationship determines that the relationship between the objects does not exist at the presumed location in the content, then score for the relationship may be reduced to 0.4. If the reviewer determines that the relationship does exist at the presumed location, then the score for the relationship may be increased to 0.6.

In other examples, a threshold to which the relationship scores are compared may be adjusted. The threshold may be reduced if updates from reviewers confirm the relationship, but may be increased if updates from reviewers indicate a correction of the relationship. In further examples, classifiers may be modified, added, or deleted based on the updates. For example, a keyword may be added to a set of classifiers if it is determined by the reviewers that a relationship between objects was missed (e.g., a predetermined number of times). For example, if the term "wed" was not identified by the content processing function 112 as indicating a marriage between two objects, then the term "wed" may be added to a set of classifiers. In this way, the relationship training model 114 may learn from inputs from reviewers or other users to more accurately determine relationships between objects in content over time.

In another example, a parameter or factor associated with a number of occurrences of a relationship in the content 120 may be adjusted based on updates from reviewers. An initial factor of 0.5 may be assigned to such a factor if the relationship appears only once in the content 120. The factor may increase by 0.1 each additional time a reference to the relationship occurs in the content 120, thereby increasing the overall score and indicating a higher probability that the relationship is correct. If a reviewer of the content 120 determines that the relationship is incorrect, then the factor may be reduced by 0.05 (e.g., a 50% reduction in the strength of the 0.1 increase) such that more occurrences of the relationship in the content 120 may be required before the same prior relationship score based on the 0.1 factor is reached, thereby reflecting a reduced confidence in the accuracy of the model 114. The above examples are for purposes of illustration and are not meant to be limiting. Numerous examples, including different rules, criteria, factors, adjustments, etc., may also exist.

Another input into the relationship training model 114 may be received from the reader device 160. A user 108 may, for example, send corrections to the encoded relationship information to the content source device 110, which may update the model 114 based on the corrections, as described above. A user interface may be provided by the reader device 160 to enable receipt of the corrections, as will be described in greater detail below. In one example, the relationship training model 114 may be updated to reflect that a relationship that was initially believed to be a parent-to-child relationship, where the parent was believed to be a mother or father of the child, may be corrected to reflect that the true relationship is that of guardian-to-child, where the guardian is not the parent of the child but is responsible for the child. Numerous other examples of corrections to relationships also exist.

The content 120, along with the encoded relationships 126 or 128 associated with (e.g., attached to) the content 120, may be distributed to the reader device 160. The content 120 may be displayed on a screen of the reader device 160, as shown in the utilization phase 150. The screen 162 may include various components that, when selected, may perform one or more corresponding functions. For example, the screen 162 may include a display object information button 164, or a similar option, to present relationship information between objects in the content 120. The presented relationship information may be based on the current location of the content 120 being displayed. In this way, relationships between objects in the content 120 may be dynamically updated as the user reads the content 120, or put another way, as the content 120 changes.

According to one example, a reader device 160 that is currently displaying a portion of content 120 (e.g., a page) that includes positions ranges P400 to P600 may display object information associated with such range. In the above example, a user who requests relationship information for John on a page that ends with P600 may receive an indication that John divorced Martha. The divorce, which occurred at P503, may be displayed because P600 occurs later than P503. A user who requested information about John at P200, however, may receive information about John being married to Martha, which occurred at P103. Because P103 is not greater than P503, the information about the divorce may not yet be displayed. In this way, the user is kept current with information about John but is not spoiled by events (e.g., a divorce) that has not yet occurred. The divorce may be represented by marking out a line connecting John and Martha (which was drawn as a result of the marriage) on a family tree. Numerous other examples may exist.

In the manner described above, relationship information that is distributed from the content source device 110 to the reader device 160 may cause the reader device 160 to display a portion of the relationship information that corresponds to the current location in content displayed on a screen of the reader device 160. The reader device may, for example, determine a relevant portion of the relationship information using the current location being displayed in content. The relevant portion of the relationship information may be relationships that occur at or prior to the current location being displayed on the reader device 160.

As further shown in the utilization phase 150, object information may be presented using various formats or information structures such as, but not limited to, a family tree 166, a timeline 168, a map 170, and a biography 172. A family tree may depict relationships between characters in a story. Example family trees are described in greater detail in FIGS. 3A-3E.

As another example, the timeline 168 may depict relationships between objects, such as events, over time. A sequence of events associated with a character or entity may be ordered along a timeline to provide the user with a chronological summary of the events. Similarly, a biography 172 may include a listing of events or actions associated with a character. Information relevant to a current location in the content 120 may be displayed on the timeline 168 or the biography 172. For example, events that occurred up to, and including, the current location in the content 120 may be displayed on the timeline 168 or the biography 172.

As another example, a map 170 may depict relationships between geographical areas and an entity. For example, a region or area ruled by a character in a book may change as new areas are conquered or lost. A map 170 may be updated accordingly to reflect such geographical changes, and may be displayed based on a current location of the content 120. Other types of relationships depicted by the map 170 may exist in other examples.

The above examples are for purposes of illustration and are not meant to be limiting. Other examples, descriptions, etc., may also exist. For example, information about an object may be displayed using a format other than the family tree 166, the timeline 168, the map 170, and the biography 172. In some embodiment, information about an object may be listed as a single line on the display screen 162, such as "John: married to Martha" in the above example. Such single line text may be extracted directly from the content 120, or may be generated by an algorithm, such as that implemented during the content processing function 112, as non-limiting examples.

Further, while the above examples relate to determining relationships between objects in a book, relationships may also be determined for other types of content, such as video, audio, or generally any content in which it may be desired to know a particular location to facilitate displaying information relevant to the location. In one embodiment, relationships in such content may be determined using text transcriptions. For example, audio books and audio associated with movies or televisions shows may be transcribed into text or other character-based representations of the audio. The transcriptions may be analyzed using natural language processors, syntax-based processors, contextual processors, text parsers, or other techniques or constructs that may rely on semantics, context, keywords, etc., to determine objects in the content. In one embodiment, the relationships in audio and video content may be identified in the same or similar fashion to that described above for an eBook. The identified relationships may be stored in an information structure (e.g., a family structure, a timeline structure, a biography structure, etc.) and distributed along with audio and/or video content to a device, such as an audio player device or a video player device, where it may be stored.

In some implementations, a user 106 may listen to an audio book or view a video, and may generate object information 142 associated with the portions of the audio or video. For example, upon viewing a wedding for John and Martha in the above example, the user 106 may indicate a time range corresponding to John and Martha's wedding, and store the time range in association with the relationship between John and Martha in relationship information. In this manner, objects in the video may also be related.

As described above, an audio player (or a similar device that outputs audio content to one or more speakers or audible components or devices) may receive audio content and relationship information from a server, such as the content source device 110 in FIG. 1, and store such information. In one embodiment, the audio player may also receive a request from a user to present a relationship, such as a family structure for a parent character, at a certain location (e.g., current location) in an audio book. The audio book may identify the requested relationship in the stored relationship information and display the requested family structure on a screen of the audio device. The relationship information may therefore be displayed as text on a screen of an audio device that outputs a story audibly, in one embodiment.

Relationships in movies and television shows may be identified in similar fashion that that described above for eBooks and audio books. A television, smartphone, or other processor-based device configured to display video, multimedia, images, text, data, or other content, may also display relationships on a screen of the device based on the current location within a movie, television show, or other content. In one implementation, an information structure depicting a relationship may be displayed on a screen on which a video is being shown such that the relationship overlays the video. In another implementation, the relationship may be displayed on a second screen associated with a first screen on which a video is being shown. As a non-limiting example, the second screen may be associated with the first screen by virtue of the screens sharing content, whether a movie or television content, relationship information associated with the movie or television content, etc.

As described above, text translations of audio portions of a video may be analyzed (e.g., by the content processing function 112) in similar fashion to that described above for text in a book to determine relationships between objects in the video. In this way, video, audio, text, and other content may be analyzed by the content source device 110 to determine relationships between objects in the 120 content based on a current location in the content 120.

Figure 2:
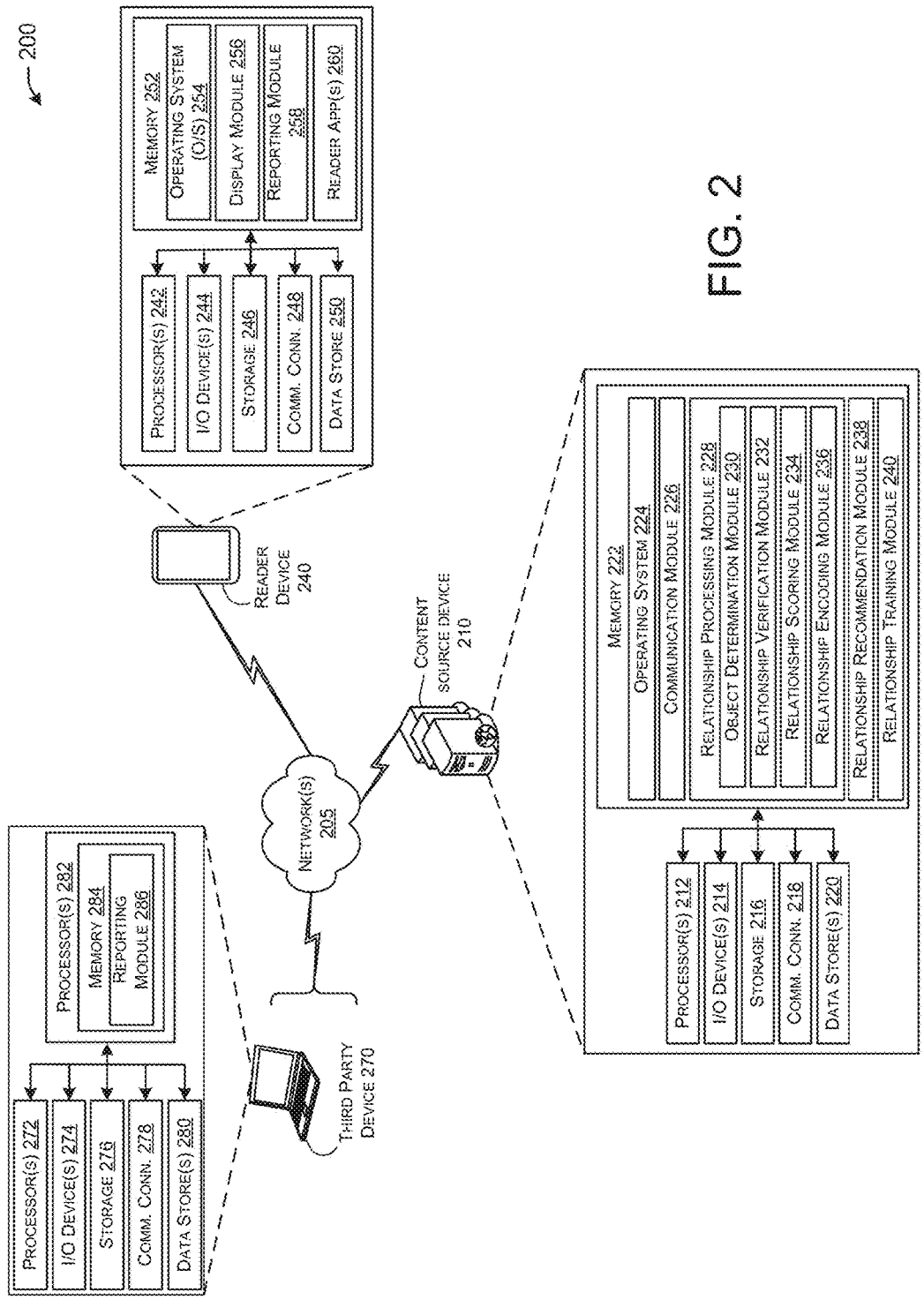
FIG. 2 illustrates an example computing environment for determining and presenting related information based on a location in content, according to an embodiment of the disclosure.

FIG. 2 illustrates an example computing environment for determining and presenting related information based on a location in content, according to an embodiment of the disclosure. The example computing environment 200 may include, but is not limited to, a content source device 210, a reader device 240, and a third party device 270. Each of these devices may communicate with one another over the one or more networks 205. For example, the content source device 210 may send content, which may include encoded relationships information between objects in the content, to the reader device 240 where it may be accessed by a user. The reader device may send modifications to the encoded relationships to the content server 210, which may update a model (e.g., the relationship training model 114 in FIG. 1) based on the modifications. In certain embodiments herein, the content server 210 may also send content to a third party device 270, where a user (e.g., an author of the content) may verify and/or modify relationship information before it is sent to the reader device 240.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, televisions, other video display devices, audio output devices, or other processor-based devices. The execution of suitable computer-implemented instructions by one or more processors associated with various devices may form special purpose computers or other particular machines that may implement or facilitate the processes described herein.

Certain embodiments may be provided as a computer program product including a non-transitory machine-readable storage medium having stored thereon instructions (in compressed or uncompressed form) that may be used to program a computer (or other electronic device) to perform the processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, the distribution of software may be downloaded via the Internet.

The one or more networks 205 may include any number of wired or wireless networks that can enable various computing devices in the example computing environment 200 to communicate with one another. In other embodiments, other networks, intranets, or combinations of different types of networks may be used including, but not limited to, the Internet, intranets, cable networks, cellular networks, wireless networks, landline-based networks, or other communication mediums connecting multiple computing devices to one another. Other embodiments may not involve a network and may, for example, provide features on a single device or on devices that are directly connected to one another.

As used herein, a sidecar file may refer to a file that stores data (e.g., metadata) that is not supported by the source file format, or a standard way for encoding information for storage in a computer file. A sidecar file may also be referred to as a buddy file or a connected file in the way that it may be associated with a source file. In one configuration, a sidecar file may include the same base name as the source file but may have a different extension to distinguish it from the source file. In one example implementation, relationship information such as that represented by the object information 142 in FIG. 1 may be a sidecar file associated with content (e.g., the content 120 in FIG. 1), such as an eBook.

The devices in FIG. 2 may include one or more processors configured to communicate with one or more memory devices and various other components or devices. For example, the content source device 210 may include one or more processors 212 that are configured to communicate with one or more memory or memory devices 222, one or more input/output (I/O) devices 214, storage 216, one or more communication connections 218, and one or more data stores 220. The processor 212 may be implemented as appropriate in hardware, software, firmware, or a combination thereof. The processors 242 and 272 of the reader device 240 and the third party device 270, respectively, may be the same or at least similar to the processor 212.

The memory 222 of the content source device 210 may store program instructions that are loadable and executable on the processor 212, as well as data generated during the execution of these programs. Depending on the configuration and type of content source device 210, the memory 222 may be volatile, such as random access memory (RAM), and/or non-volatile, such as read-only memory (ROM), flash memory, etc. The memory 252 and 284 of the reader device 240 and the third party device 270, respectively, may be the same or at least similar to the memory 222.

The storage 216 of the content source device 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 246 and 276 of the reader device 240 and the third party device 270, respectively, may be the same or at least similar to the storage 216.

The memory 222 and the storage 216, both removable and non-removable, are examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 222 may include multiple different types of memory, such as static random access memory (SRAM), dynamic random access memory (DRAM), or ROM.

The one or more communication connections 218 may allow the content source device 210 to communicate with other devices, such as the reader device 240, the third party device 270, databases, user terminals, and various other devices that may exist on the one or more networks 205. In one embodiment, the communication connections 248 and 278 of the reader device 240 and the third party device 270, respectively, may be the same or at least similar to the communication connections 218.

The I/O devices 214 may enable a user to interact with the content source device 210. Such I/O devices 214 may include, but are not limited to, a keyboard, a mouse, a pen, a voice input device, a touch input device, a display, a camera or imaging device, speakers, or a printer. The I/O devices 244 and 274 of the reader device 240 and the third party device 270, respectively, may be the same or at least similar to the I/O devices 214.

The data stores 220 may store lists, arrays, databases, flat files, etc. In some embodiments, the data stores 220 may be stored in memory external to the content source device 210 but may be accessible via the one or more networks 205, such as with a cloud storage service. The data stores 220 may store information that may facilitate the processes described herein. Such information may include, but is not limited to, rules or criteria that may be used to identify objects in content, such as classifiers for identifying parts of speech in a sentence; context clues or keywords associated with the classifiers (e.g., "married," "divorced," "born," etc.) that may be used to identify events in content; a genre associated with the content such that a different set of classifiers (referred to herein as subclassifiers) may be used to identify events based on the genre; keywords that may be used to verify a relationship, such as "Mrs." to verify a marriage, "Jr." to verify a birth, etc.); relevant positions ranges within the content for identified objects; scores indicating a probability that a relationship between objects exists; factors that may be used to determine the score, such as proximity of objects to one another, the number of times a relationship is indicated in the content (which may be identified by the proximity of related objects to one another), whether name changes exist for the same character (e.g., "Ms. to Mrs." as described above), etc.; one or more threshold values for comparison to a score; and identifications of users to whom the content was distributed, or from whom the content was received (e.g., authors of the content), etc.

Turning to the contents of the memory 222, the memory 222 may include, but is not limited to, an operating system 224 and various software applications and/or modules that may implement or facilitate the processes described herein. Example modules may include, but are not limited to, a communication module 226, a relationship processing module 228, a relationship recommendation module 238, and a relationship training module 240. Each of these modules may be implemented as individual modules that provide specific functionality associated with allocating impressions using various ad campaign management techniques. Alternatively, one or more of the modules may perform all or at least some of the functionality associated with the other modules.

The operating system 224 may refer to a collection of software that manages computer hardware resources and provides common services for computer programs to enable and facilitate operation of such programs. Example operating systems may include UNIX, Microsoft Windows, Apple OS X, etc. The operating system 254 and 276 of the reader device 240 may be the same or similar as the operating system 226.

The communication module 226 may enable the content source device 210 to communicate with the other devices shown in FIG. 2, among other devices. For example, the communication module 226 may receive content from a third party device 270, and may distribute content processed according to the techniques herein to the reader device 240 and/or the third party device 270, where it may be displayed and/or verified.

The communication module 226 may implement various communication protocols to communicate with the devices in FIG. 2. Example protocols may include Hypertext Transfer Protocol (HTTP), extensible Markup Language (XML), Transmission Control Protocol/Internet Protocol (TCP/IP), Simple Mail Transfer Protocol (SMTP), socket-based protocols such as the WebSocket protocol, or other message formats and/or rules for exchanging information between computing devices.

The relationship processing module 228 may perform functions associated with determining relationships, including changes in relationships, between objects in content. In one embodiment, the relationship processing module 228 may perform the same or similar functions as content processing 112 in FIG. 1. As non-limiting examples, the relationship processing module 228 may determine relationships between characters in a book (e.g., a family tree), between events and time of occurrence (e.g., a timeline), between actions and a character who performed the actions (e.g., a biography), and between geographical areas and an entity (e.g., a map). The relationship processing module 228 may further associate determined relationships with particular locations in content at which the relationships exist. In this way, only relevant (e.g., current) relationships may be displayed to a user of content based on a current portion of the content being displayed to the user. Presentation of relationship information based on location may prevent displaying out-of-date relationships or spoiling future events in the content that have not yet been accessed by the user.

In one embodiment, the relationship processing module 228 may include an object determination module 230, a relationship verification module 232, and a relationship scoring module 234 to facilitate the determination of relationships between objects in content. The object determination module 230 may determine one or more objects (e.g., characters, places, events, etc.) in content. In one embodiment, the objects may be identified using classifiers, which may be used by the object determination module 230 to determine parts of speech of a phrase or sentence. Such determination may facilitate identifying subjects, objects of sentences, actions in the sentences, etc. As described above, context clues or keywords may be used to identify certain events in content. The objection determination module 230 may identify the subjects and objects of the sentence based on their proximity to an identified event, among other considerations. In some embodiments, various natural language processors, syntax-based processors, contextual processors, text parsers, other techniques or constructs that may rely on semantics, context, keywords, etc., to determine objects in content, and/or various algorithms may be utilized to classify the parts of a phrase or sentence to facilitate identifying objects, and hence relationships, in the content.

In some embodiments, the object determination module 230 may determine objects by analyzing supplemental content (e.g., the supplemental content 122 in FIG. 1), which may include information about the objects in content (e.g., characters, places, events, etc.), a list of objects, etc. The object determination module 230 may parse such information in the supplemental content to determine the objects. Objects determined from the supplemental content may be included in context clues associated with classifiers such that the objects may be searched for in content (e.g., primary content). In this way, characters, places, events, or other objects in content may be identified from sources outside of the content, stored, and used to determine relationships between such objects in the content. Primary content, or generally content, may be used herein to denote main content (e.g., a story in an eBook), which may be distinguishable from supplemental content.

As described above, the object determination module 230 may determine events, actions, or occurrences in content. In one embodiment, context clues or keyword terms may be used to determine the events. Example keywords may include "married," "divorced," "born," or any term that may suggest an action or occurrence. The keywords may be searched in content to determine whether they exist in the content. The object determination module 230 may further determine that certain objects (e.g., characters in a story) are related to the event. Such a determination may be based on the objects' proximity to the event, whether they are the subject or object of a sentence that includes the event, as well as other criteria. Objects that are determined to be related may be depicted as such using various association techniques, such as a family tree, a timeline a map, a biography, etc.

The object determination module 230 may also store the location at which the relationship between the objects (e.g., characters and events in the present example) was determined. Such a location may be a range that includes the relationship. All or at least a portion of the range may be associated with the relationship in various embodiments herein. Examples of associating relationships of objects with locations in content will be described in greater detail below.

The object determination module 230 may further determine a type of format or association that may be used to present relationship information. Based on context clues associated with classifiers, in one embodiment, the object determination module 230 may determine whether relationship information should be presented using a family tree, a timeline, a map, a biography, or other techniques for presenting the relationship information, as described above in association with the content processing function 112 in FIG. 1.

The relationship verification module 232 may verify relationships in content. In so doing, the relationship verification module 232 may identify information that may corroborate the existence of a relationship. The relationship verification module 232 may analyze portions in the content occurring after the location at which a relationship was first identified to verify the relationship, in one embodiment. For example, successive references to the relationships, such as mentions of the relationship, may be used to verify the relationship. Other information, such as titles, names change, etc., may be used to verify the relationship. These and other examples will be described in greater detail below.

In certain embodiments herein, verification of a relationship may mean that a certain score may be assigned to the relationship. For example, a relationship that is verified may receive a relatively higher score than a relationship that has not been verified. In this way, the probability that a relationship is valid may be increased to reflect a greater confidence that the relationship processing module 228 has correctly determined a relationship and the location of the relationship in the content.

The relationship scoring module 234 may determine a score for a relationship between objects. As described above, the score may indicate a probability that a relationship has been correctly identified, in one embodiment. For example, a score of 0.9 may indicate a relatively high probability that the relationship is valid, whereas a score of 0.1 may indicate a relatively low probability that the relationship is valid. Various types of relationships may be scored. For example, a relationship between a husband and wife, siblings, parent and child, employer and employee, etc., may be scored to indicate a likelihood that the relationship exists at a presumed location in the content.

Various factors may be used to determine the score. An example factor may include proximity of objects in content, as described above. In one embodiment, the closer objects are to one another, the higher may be the factor for determining the score. For example, if two objects are separated only by an event object (e.g., "married" as in "John married Martha"), then a factor greater than 1.0 (e.g., 1.5) may be used such that when the factor is multiplied by the current score (e.g., a default score), the score may increase to reflect a greater confidence that the relationship is correct. The factor may be decreased, however, as the number of terms separating the objects increases, in one embodiment.

Another factor for determining a relationship score may include the number of references to the relationship in the content. As the number of references to the relationship increases, a score factor may also be increased. A threshold number of references (e.g., ten references) may be used to establish the factor, in one embodiment. When the threshold number is exceeded, the factor may be greater than 1.0, thereby increasing the overall score (when multiplied by another number) to reflect an increased likelihood that the relationship is valid. Numerous other examples may exist.

Another factor for determining a relationship score may include the number of times a presumed relationship is verified (e.g., by the relationship verification module 232). As the number of times a relationship is verified increases, a score factor may also be increased. A threshold number of verifications may also be used to establish the factor, in one embodiment. When the threshold number is exceeded, the factor may be greater than 1.0, thereby increasing the overall score (when multiplied by another number) as described above.

Various other factors, weightings of the factors, etc., may exist in other examples such that a probability that a relationship exists may be increased or decreased according to various criteria used to evaluate the relationship determination. In one embodiment, each factor used to determine a score may be weighted according to strength of the factor, as described in the above example. Each factor value may be multiplied against one another to determine a final score, in one embodiment. Numerous other techniques, criteria, weightings, factors, etc., may exist in other embodiments.

The determined score may be compared to a threshold, in one embodiment. A score that exceeds the threshold may indicate that a relationship between objects exists. In such instances, information associated with the objects may be stored in the content, such as the object information 142 in FIG. 1, or otherwise associated with the content. Objects having a relationship score that does not exceed the threshold may be excluded from the content, or otherwise may not be associated with the content. In some embodiments, all or at least a portion of determined relationships, irrespective of their score, may be associated with the content and provided to a user to confirm whether the relationship is valid.

The relationship recommendation module 238 may send information associated with relationships between objects to a third party device 270 associated with a user, such as an author of content. The relationship information may include all or at least a portion of the object information 142 described in FIG. 1.

The third party device 270 may include one or more program modules that may display the content and the relationship information. The content and relationship information may be displayed in a manner that allows a user of the third party device 270 to review the content, modify existing relationship information, add new relationship information, delete relationship information, or perform similar actions such that the relationship information is consistent with the content.

The relationship training module 240 may model relationships between objects. Such modeling may include modifying one or more parameters associated with algorithms or techniques implemented (e.g., by the relationship processing module 228) to determine relationships between objects in content. The parameters may be updated in response to receiving updates from the user of the third party device 270, in one embodiment. The parameters may also be updated in response to receiving updates from a user of the reader device 240, who may also send modifications to presumed relationships between objects to the content server 210. In one embodiment, the relationship training module 240 may implement the same or similar functionality to the relationship training model 114 in FIG. 1.

The relationship encoding module 236 may perform functions related to storing relationship information in association with content. For example, the relationship encoding module 236 may store the relationship information in a format recognizable to the reader device 240. An example format may be the object information 142 described in FIG. 1. A text delimited format may also be used in other examples, as well as other formats.

The relationship encoding module 236 may also embed relationship information in the content. In one embodiment, the relationship information may be embedded as metadata in the content. In another embodiment, the relationship information may be embedded in one or more sidecars associated with the content. In yet another embodiment, a link or reference to the relationship information may be embedded in the content such that when the reference is selected, the relationship information may be accessed over a network, such as the one or more networks 205. Various other techniques for associating relationship information with content may be used in other examples.

As described above, the reader device 240 may display content and relationship information between objects in the content, as well as modify the relationship information. The reader device 240 may include software applications and/or modules in the memory 252 to enable such functionality. Example modules may include, but are not limited to, an operating system 254, a display module 256, a reporting module 258, and reader applications 260.

The display module 256 may perform functions related to displaying content and relationship information associated with relationships between objects in the content. In so doing, the display module 256 may display relationship information that is relevant to a current portion (e.g., page) of the content being displayed at the reader device 240. In one embodiment, relationship information may be relevant if it is related to the current and/or previous content displayed by the reader device 240. By displaying such relevant relationship information, relationships associated with objects (e.g., characters, places, event) in the content may not be presented out of date or such that they spoil future events in the content.

One function performed by display module 256 may include receiving inputs from a user of the reader device 240. Such inputs may include a request for relationship information. The request may be for information related to a particular object, such as a character in a story, places in a larger geographical area, etc. The inputs may also include a request for a particular format or type of association for the information, such as a family tree, a timeline, a biography of events for a character, a map, etc. The display module 256 may determine relationship information to display at the reader device 240 based on such inputs. For example, upon receiving a request for a family tree, the display module 256 may determine relevant relationships for the family tree based on the current content displayed at the reader device 240. Detailed examples of such functionality will be described in FIGS. 3A-3E.

The display module 256 may also prompt the user of the reader device 240 for certain inputs. For example, if a user requests a family tree at a certain location in the content that includes characters from distinct families, then the display module 256 may prompt the user to indicate which character for whom the family tree should be shown. The display module 256 may not prompt the user for such an indication if the one or more characters relevant to the current location in the content are in the same family.

In determining which information to display to a user, the display module 256 may determine the current location in the content, such as the position ranges for the current page displayed on a screen of the reader device 240, and filter the relationship information (e.g., the object information 142 in FIG. 1) according to information that occurs prior to, and including (but not beyond), the current location in the content, in one embodiment. After the filtered information is determined, the display module 256 may further filter the information according to particular objects (e.g., characters in a story) for whom information may be requested.

The display module 256 may also parse portions of content, such as a current page being displayed, to determine current objects in the content. Such objects may be displayed to a user such that the user may select a particular object (e.g., character) for whom the user desires to view relationship information.

The reporting module 258 may provide an interface for the user to correct relationship information. In one embodiment, the interface may be a graphical interface that presents relationship information, such as the information in the object information 142 in FIG. 1. The user may modify all or at least a portion of such relationship information. For example, the user may modify the indicated relationship, the range for the indicated relationship, the identification of the related object (e.g., character), the type of format for the relationship information, etc. The reporting module 258 may store the updated information and send it to the content source device 210. The reporting module 286 of the third-party device 270 may perform the same or similar functionality as the reporting module 258 of the reader device 240.

The one or more reader applications 260 may enable the reader device 240 to perform any number of functions or features for the reader device 240. Such features may enable the display of and interaction with various types of content, such as eBooks, games, videos, audio, multimedia content, text, etc., among numerous other features.

The above descriptions in FIG. 2 are for purposes of illustration and are not meant to be limiting. Other descriptions, examples, features, etc., performed by the same or different devices may exist in other examples.

FIGS. 3A-3E depict example content and object information associated with a particular location in the content, according to an embodiment of the disclosure. A reader device, such as the reader device 240 in FIG. 2, may display relevant object information based on the current location (e.g., a current page) in the content, in one embodiment. A relevant location may include relationship information up to and including the current location in the content. While the examples in FIGS. 3A-3E relate to text in a story, the techniques herein may be applied to any content in which it is desired to know information with respect to a particular location in the content.

Figure 3A:
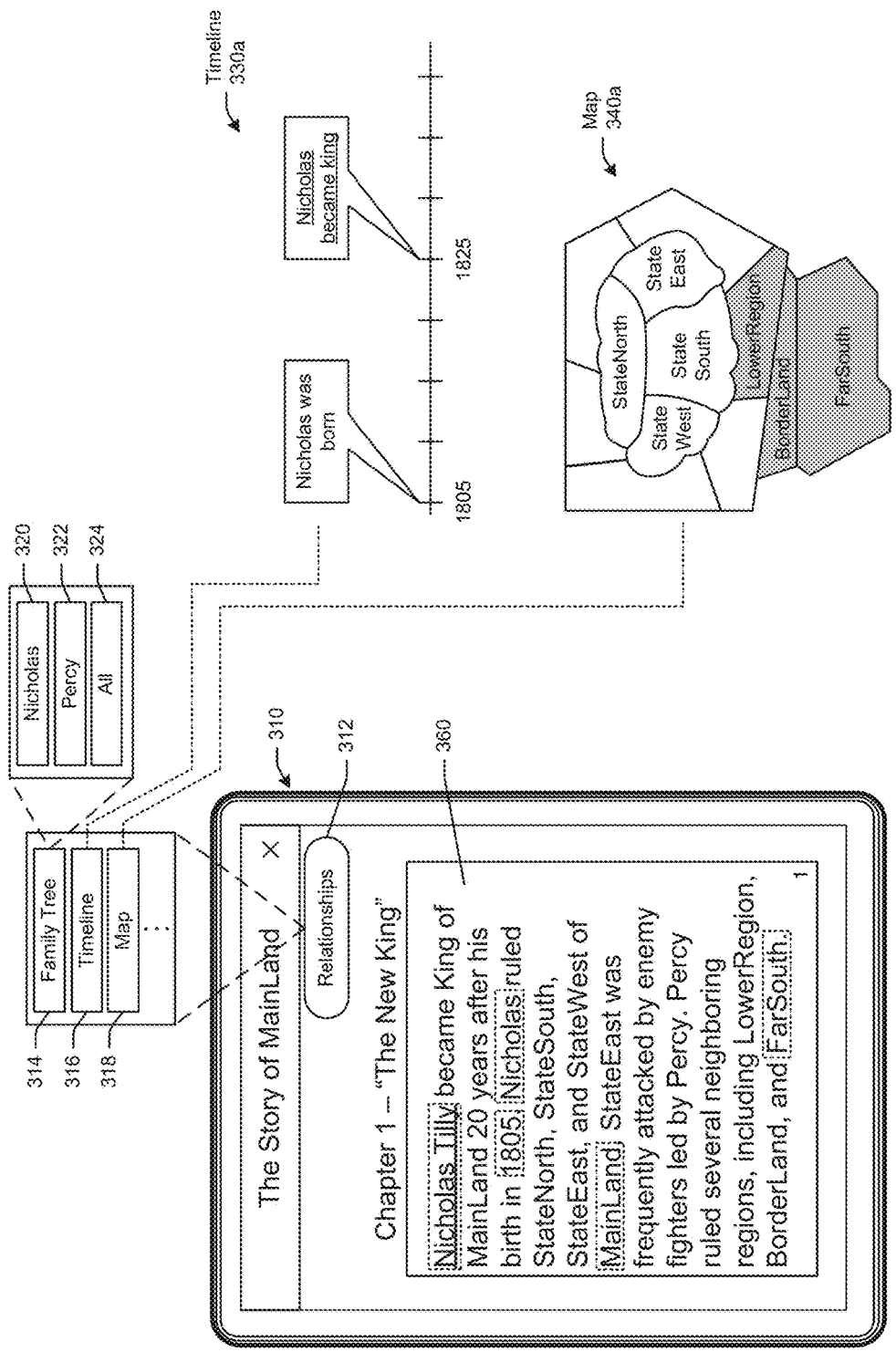
FIGS. 3A-3E illustrate example content and object information associated with a particular location in the content, according to an embodiment of the disclosure.

As shown in FIG. 3A, a reader device 310 may display content 360, which may be story text formatted for an eBook or other electronic device, in one embodiment. Each word in the content 360 may have a unique position. The unique position may be a number that ascends from one (1) to the last character in the story, in one embodiment. For example, "Nicholas" may be assigned position one (P1) since it is the first word in the content 360. "FarSouth" may be assigned position forty-two (P42) since it is the forty-second word in the content 360. Sentences or phrases associated with an object (e.g., a character in the story) may have a starting and an ending position. For example, Nicholas' birth and rise to king are both described between position range one (P1) and thirteen (P13), as indicated by the dotted boxes around words in these positions. Position range one (P1) to thirteen (P13) may therefore be considered relevant to Nicholas.

As described above, relationship information, such as the object information 142 in FIG. 1 which may be embedded in the content 360, may store a position range of P1 to P13 for Nicholas. In one embodiment, a range for Nicholas may be inclusive of the first and last position in the content 360 related to Nicholas. For example, if Nicholas is last mentioned at position P1000, then a range for Nicholas of P1 to P1000 may be stored in the object information 142 for Nicholas.

The above events related to Nicholas may be classified and identified in the relationship information as timeline events, as described above. An example of the timeline information is shown as timeline 330a, where Nicholas' birth in 1805 and his rise to king in 1825 are shown. When a user selects timeline 316, and requests information for Nicholas, the reader device 310 may display the information in P1 to P13, or a derivation of this information, since it is prior to the current content range being displayed (e.g., position forty-two (P42)).

An example of determining which relationship information to display based on a current location in the content 360 may be as follows. Upon receiving a request to display a timeline for Nicholas, relationship information, such as that stored in the object information 142 associated with the content 360, may be search to identify relationship information for Nicholas. After identifying relationship information for Nicholas, the relationship information may be further filtered according to a format desired by a user (e.g., a timeline in the present example). In this way, information related to timeline events for Nicholas may be identified.

To determine which timeline events for Nicholas to display, the position range of the content 360, or the current page, may be used. In one embodiment, the upper limit range, or the position of the last word on the content 362 may be used as a point beyond which information about Nicholas may not be displayed. In this way, the content 360 may not be spoiled to the user by presenting information that has not yet been displayed by the reader device 240. Further, the most recent information up to and including the upper limit range (but not beyond) may be displayed to facilitate presenting the most current relationship information to the user.

As a further example, if relationship information for Nicholas indicates an event that occurred at position P43, such information may not be displayed because it exceeds the upper limit of P42. If an event occurs at P20, relationship information associated with the event may be displayed because it occurs prior to P42. If the relationship changes or is corrected in a story, for example, at P39, the most recent information about Nicholas may be displayed. Thus, the relationship information associated with P39 may be displayed instead of the relationship information at P20. In other examples, all events prior to and including P42, but not beyond, may be displayed.

The above example is for purposes of illustration and is not meant to be limiting. While the above example relates to a timeline, the same or similar techniques may be used to determine which relationship information to display for family trees, maps, biographies, or other formats. These techniques may be applied to the following descriptions associated with FIGS. 3B-3E, among other descriptions.

Continuing, the geographical regions in MainLand may be associated with position range P14 to P22 in the content 360, as indicated by the dotted lines around words in these positions. The information within this range may be displayed in map 340a when a user selects button 318 to display a map.

Further, geographical regions identified in the content at position range P33 to P42 may be displayed. Such regions ruled by Percy are also shown in the map 340a and are distinguished from regions ruled by Nicholas using shading.

In some embodiments, particular information associated with an object (e.g., a character) may be requested. In one embodiment, an identification of a character in the content 360 may be selected (e.g., via a long press). Such a selection may result in particular information being displayed for the character. In the present example, a long press on Nicholas Tilly may result in the display of various information about Nicholas. For example, Nicholas' title (e.g., "King of Main-Land") may be displayed adjacent to his name. Nicholas' age, relationship with other characters, etc., may also be shown in other examples. In this way, text descriptions of objects may be provided separate from, or in addition to, a family tree, a timeline, a map, or other formats, information structures, or association techniques.

While a family tree is not shown in FIG. 3A, a user may select an option 314 to display a family tree. In the present example, a family tree for Nicholas may be displayed by selecting button 320, while a family tree may be displayed for Percy by selecting button 322. An option to select family trees for Nicholas and Percy may be provided based on a determination that both characters are relevant to the current position range of one P1 to P42, or page 1. A user may also be provided with an option 324 to display a family tree for "all" objects or characters on the current page in the content, for example, both Nicholas and Percy. In this way, multiple objects for any format, information structure, or association technique may be provided as selection options for a user. The relationships button 312, when selected, may provide such options to the user as shown in FIG. 3A. While FIGS. 3B-3E do not show particular options when the show connection button 312 is selected, such options may exist.

As relationship information changes, such as when new content is displayed on the screen of the reader device 310, the updated relationship information may be displayed based on the current location in the content 360. In this manner, any information related to an object (e.g., a character) up to, and including, the current location in the content 360 may also be displayed. Thus, past information may be kept current, and future information may not be presented to a user before it is displayed.

Figure 3B:
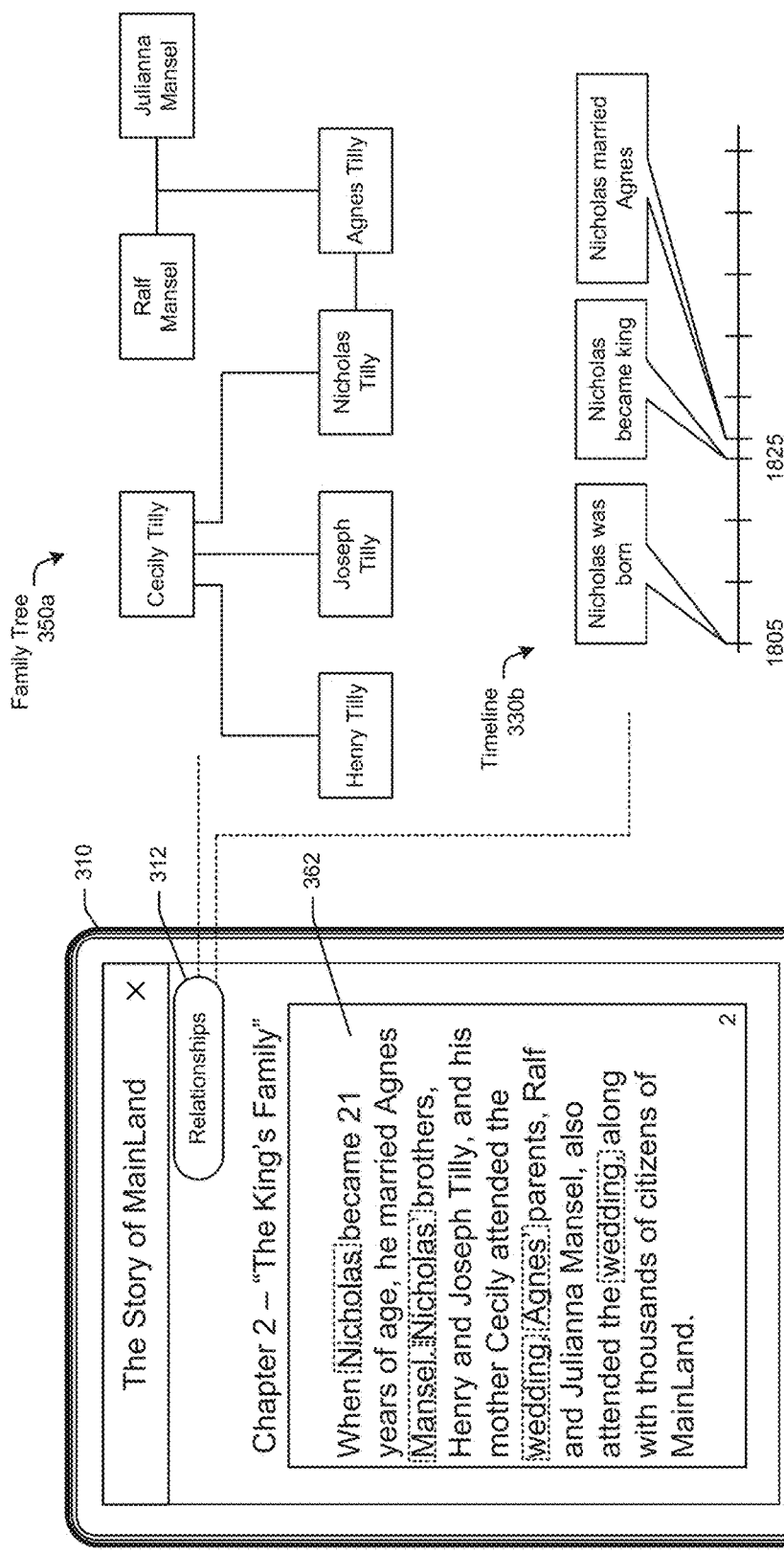

FIG. 3B depicts content 362 displayed on the reader device 310. Content 362 may be the second page of the story following the content 360 in FIG. 3A. The upper range of the content 362 may be P82 in the present example. Relationship information may not be displayed beyond this position, in certain embodiments herein. Position ranges for the words in the content 362 may be identified in the same or similar fashion to that described for in FIG. 3A. Two example formats or information structures are displayed in FIG. 3B, those being a family structure 350a (e.g., a family tree) and the timeline 330b. An option to select either of these formats may be provided upon a user selecting the relationships button 312, in one embodiment.

Familial relationships may be identified in the content 362. In the present example, position range P44 to P53 indicates that Nicholas married Agnes Mansel. Such a relationship may be indicated in the timeline 330a by a line connecting Nicholas and Agnes, as shown. The marriage between Nicholas and Agnes may be verified or corroborated by identifying further indications of the marriage that occur beyond the location at which the marriage was initially determined. For example, the appearance of the term "wedding" as it relates to Nicholas and Agnes may be determined at positions sixty-five (65) and seventy-five (75). In such instances, a score associated with the marriage relationship may be increased for each verification of the relationship, in one embodiment, as described above.

The family tree 350a may result from an analysis of the content 362 according to the techniques described herein. Based on such analysis, it may be determined that Cecily Tilly is the mother of Nicholas Tilly, who has brothers named Henry Tilly and Joseph Tilly, as shown. Agnes Tilly's parents may be determined to be Ralf Mansel and Juliana Mansel. Prior to the wedding, Agnes Tilly may have been shown as Agnes Mansel.

The content 362 may also be analyzed to determine timeline events. For example, "21 years of age" in light of Nicholas' age of 20 in the content 360 in FIG. 3A, may indicate that the marriage occurred one year after 1825, hence 1826. As shown, the event of Nicholas marrying Agnes may therefore be shown as occurring in 1826 on the timeline 330b. The timeline 330b may include the events from timeline 330a and may further include events that were identified in the content 362. In this way, relationship information may be updated and displayed by the reader device 310 when it occurs in the content, but not sooner or later than P82, which is the last position in the content 262, or page 2.

In one embodiment, a reference or link may be associated with information in a timeline. An example link may include "Nicholas becomes king" in 1825, as indicated by such text being underlined. When the link is selected, a portion of content (e.g., a page), such as the content 360 in FIG. 3A in the present example, may be displayed to the user. In this way, the user may be redirected to the events associated with Nicholas becoming king. Any text may be referenced in such fashion such that, when selected, a user may be redirected to a previous point in the content associated with the referenced content.

In certain embodiments, additional information may be displayed in association with a character on a family tree. For example, "King of MainLand" may be displayed adjacent to Nicholas' name in the family tree. Such information may have been determined from the content 360, as described above. Various types of information may be associated with any of the characters in the family tree 350a, or other formats or information structures such as a timeline, map, biography, etc.

Figure 3C:
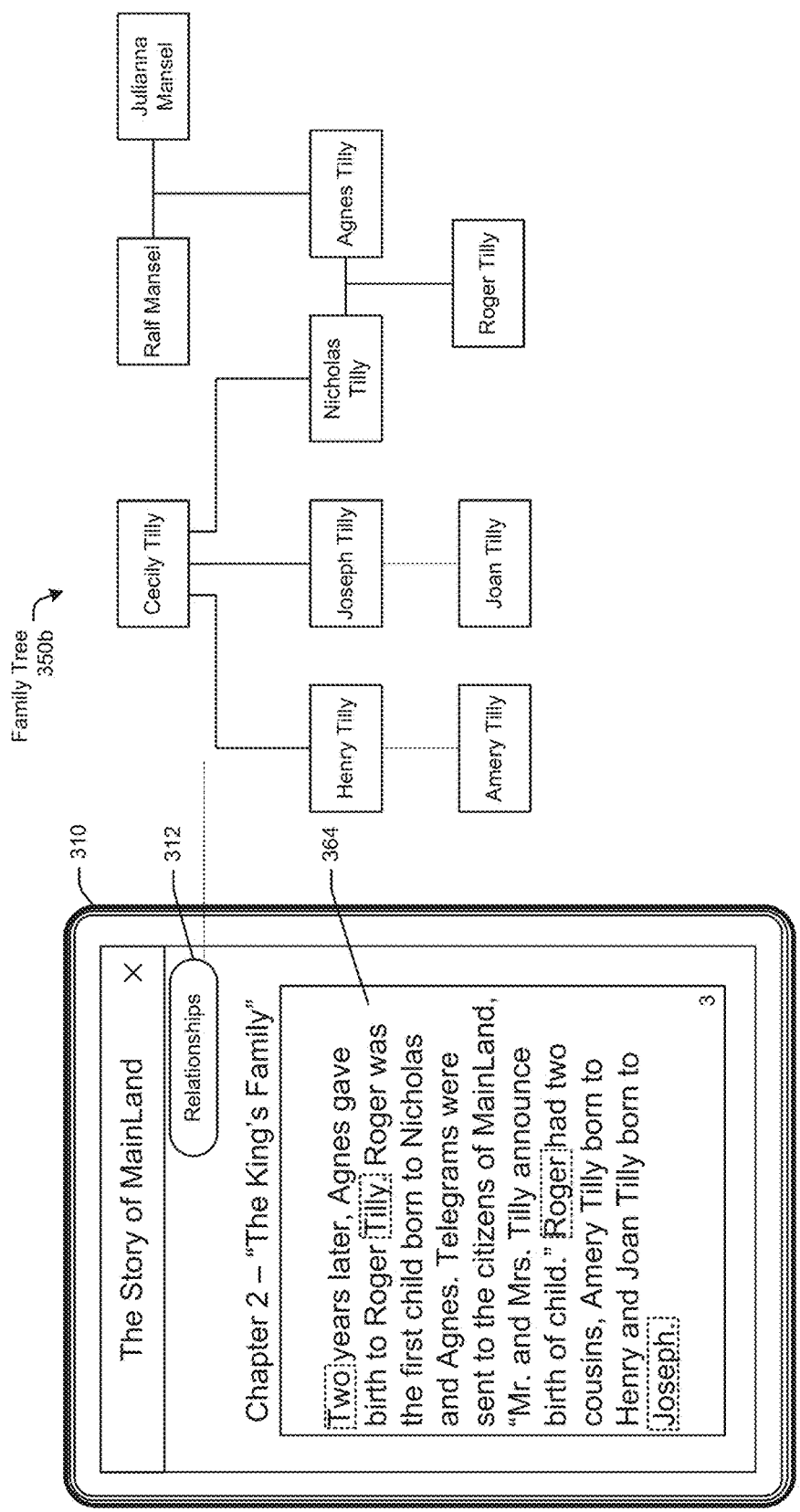

FIG. 3C depicts an example change in familial relationships. The content 364, which may immediately follow the content 362 in FIG. 3B, may indicate that Agnes gave birth to a child, Roger Tilly. Such an event may be identified at position range P83 to P91. The family tree 350*b* in FIG. 3C, which may include the previous familial relationships from the family tree 350*a* in FIG. 3B, may be updated to include a line connecting Roger Tilly to Nicholas and Agnes to indicate that Roger Tilly was born to Nicholas and Agnes. Position range P118 to P132 may be determined to indicate a relationship between Roger Tilly and cousins, Amery and Joan. The family tree 350*b* may be updated to show that Amery is a child of Henry Tilly and Joan is a child of Joseph Tilly.

The marriage between Nicholas and Agnes may be further verified upon identifying the sentence "Mr. and Mrs. Tilly announce birth of child." The occurrence of "Mrs. Tilly" may be used to verify that a marriage occurred between Nicholas and Agnes. A relationship score between Nicholas and Agnes may be increased as a result.

A timeline (not shown) may also be updated based on the events in the content 364. For example, the occurrence of "two years later" may be analyzed to determine that Agnes gave birth to Roger Tilly when Nicholas was twenty-three (23) years old (e.g., 21 years old+2 years later). An event about the birth of a child may be included on a timeline (e.g., the timeline 330*b* in FIG. 3B).

Figure 3D:
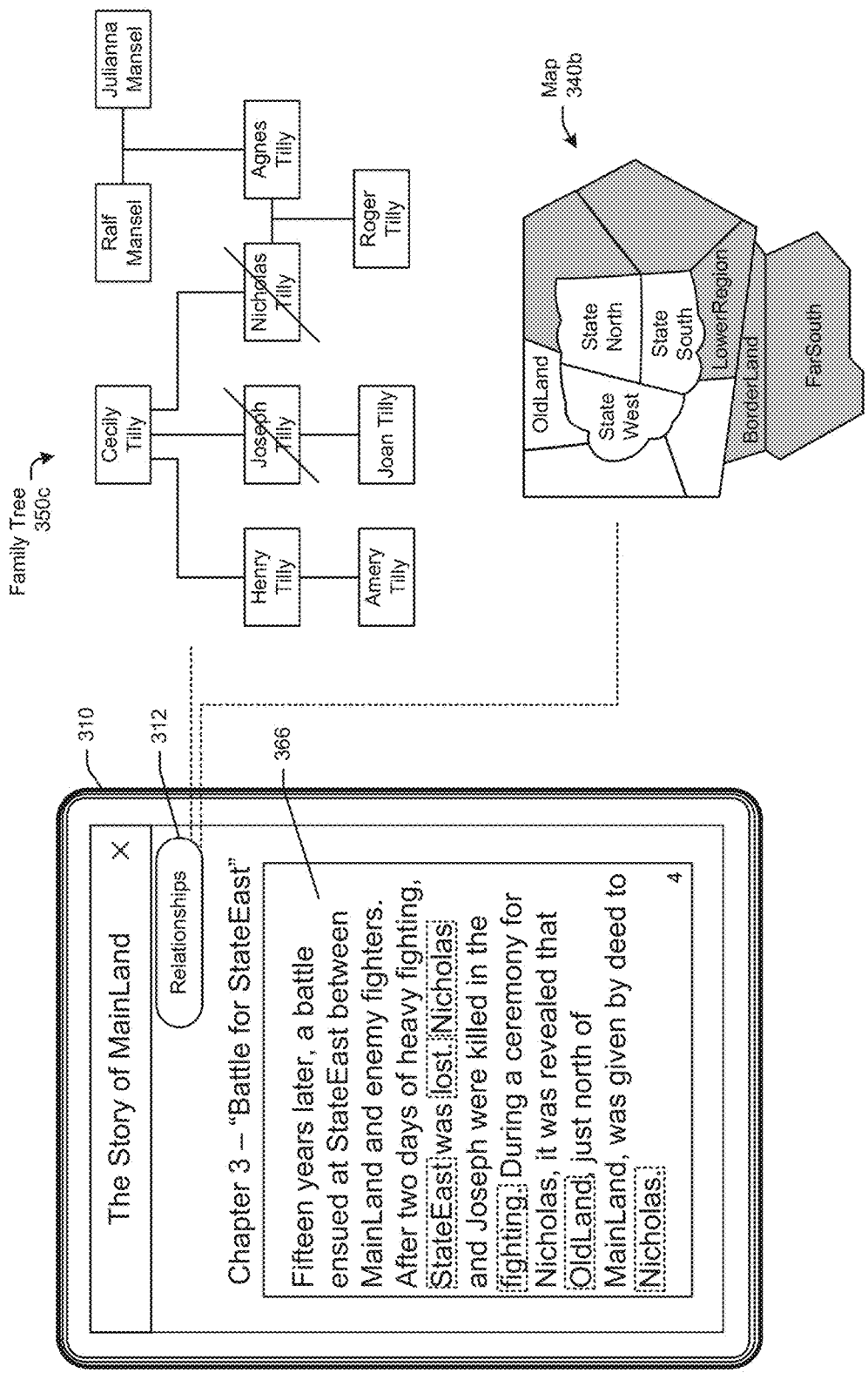

FIG. 3D depicts an example change in a familial relationship and a geographic relationship based on new content 366. The content 366 may immediately follow the content 364 in FIG. 3C, which may be the previous page in an eBook. In similar fashion to that described above, it may be determined that Nicholas Tilly and Joseph Tilly were killed. The family tree 350*c*, which may include the previous relationships from the family tree 350*b* in FIG. 3C, may be updated to reflect these events by striking through the named of Nicholas and Joseph, as shown.

Further, it may be determined that StateEast is no longer associated with MainLand. As shown on the map 340*b*, which may include the regions from previous map 340*a*, StateEast may no longer exist. A new region, OldLand, may be determined to part of MainLand based on a "deed to Nicholas," as may be identified in the content 366. For example, the term "deed" may be a context clue classifier that may be used to determine that someone (e.g., "Nicholas," whose name appears in close proximity to "deed") received land or property.

Figure 3E:
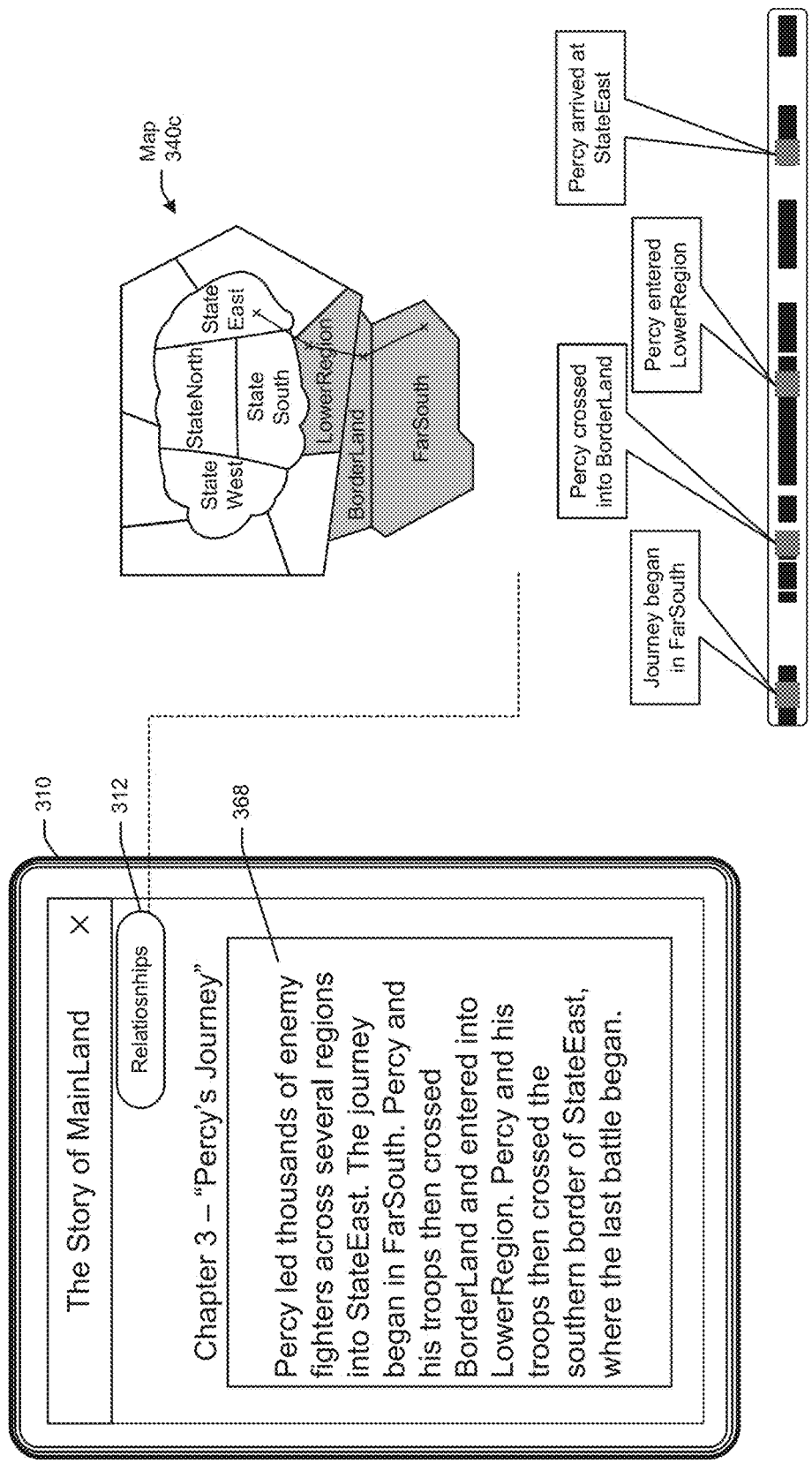

FIG. 3E depicts example travel across geographical territories using map and timeline formats. The content 368 displayed by the reader device 310 may be determined to include a description of locations traveled by a character. As shown on the map 340 by lines connecting the symbols "x," Percy and his troops travel from FarSouth to BorderLand, and then to LowerRegion before entering StateEast. An associated timeline may indicate such travel. In some examples, dates associated with the travel may be captured and included on the timeline in similar fashion to the timelines 330*a* and 330*b* described above. The timeline shown in FIG. 3E may therefore be a temporal timeline, in one embodiment.

In other embodiments, the timeline may indicate a location in content, such as an eBook, that a user is currently viewing. In one implementation, a spoiler guard may be used to prevent a user from accessing a portion of the content that has not yet occurred with respect to a user's current location in the content. For example, if a user is at the point in content that corresponds to "Percy entered LowerRegion," then the user may be prevented from viewing any portion of the content that comes after this current point in the content. Portions of the content that come after the current point may be grayed out or may otherwise indicate that content beyond the current point is inaccessible. In one example, a user who is currently viewing content associated with "Percy entered LowerRegion" may attempt to select "Percy arrived at StateEast," which occurs later in the content, as shown. Because such content occurs later, the user may be prevented from accessing details associated with Percy's arrival at StateEast. In this way, a spoiler guard may be implemented to prevent spoilers or the presentation of events too soon with respect to a user's current location in content.

In another implementation, the white space shown on the timeline may be used to implement a spoiler guard by preventing a user from accessing a portion in content that may correspond to the white space on the timeline. In this implementation, a user may be able to select details associated with Percy's arrival at StateEast, which occurs beyond the white space on the timeline temporally, but the user may not be able to select the portion of content corresponding to the white space. Such a portion of content may occur on a timeline sequence of events before Percy's arrival to StateEast, but may not be desirable for presentation to a user because, for example, the portion of content may be meant for display as a flashback after it is revealed that Percy arrived in StateEast. After such an event is revealed, in the present example, a user may access content to learn, for example, the sequence of events that transpired to make Percy's arrival to StateEast successful. In the example ways described above, a spoiler guard may act to prevent information in content from being displayed based on the information's occurrence on a temporal timeline, as well as prevent information from being displayed irrespective of when the information occurs on a timeline sequence of events, but rather where the information occurs in the content.

In certain embodiments herein, a user may select an error report option (not shown) to modify relationship information, such as that which may be displayed on the example family trees, timelines, and maps shown above. The modified information may be sent to a remote device (e.g., the content source device 210 in FIG. 2), where it may be used to update a training model for determining relationships between objects in content.

The above descriptions in FIGS. 3A-3E are for purposes of illustration and are not meant to be limiting. Numerous other descriptions, examples, embodiments, etc., may exist. For example, different formats for associating relationship information may exist. For example, a biography of a character's actions may exist. Also, different terms in the content may be identified and associated with certain events associated with objects, such as characters, places, etc. Also, a different interface with different selection options providing the same or different features may also exist, along with different views or illustrations of the content. Further, the family tree, timeline, and map illustrations in FIGS. 3A-3E are shown outside of the screen portion of the reader device 310 for ease of illustration. Such format components may overlay story text, images, or other content. A button may exist on each component such that, when clicked, the component may close and content on the prior screen may be displayed.

Figure 4:
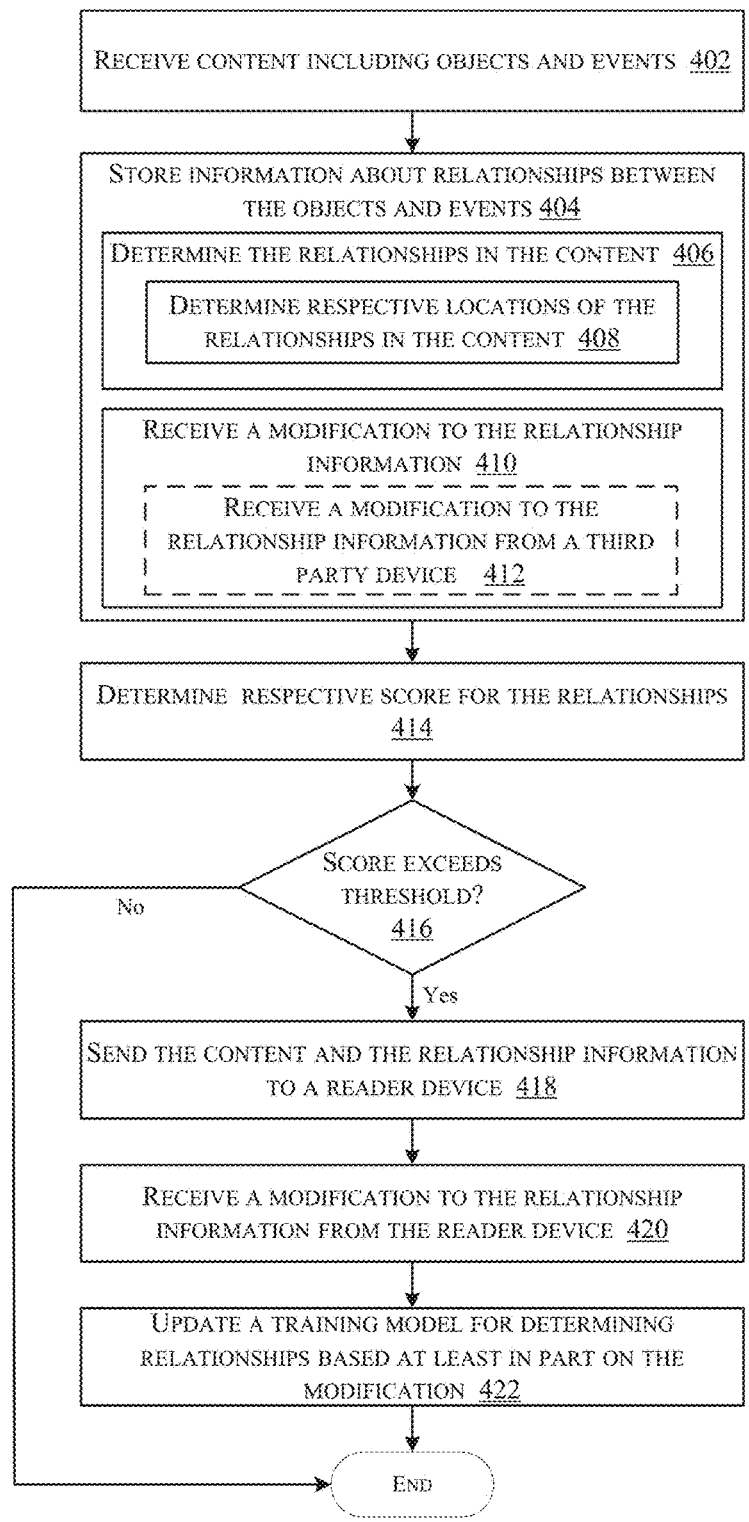
FIG. 4 illustrates a flow diagram of an example process for determining and associating related information with a location in content to facilitate presentation of the related information, according to an embodiment of the disclosure.

FIG. 4 illustrates a flow diagram 400 of an example process for determining and associating related information with a location in content to facilitate presentation of the related information, according to an embodiment of the disclosure. The example process 400 may be performed by the content source device 210 in FIG. 2, in one embodiment.

The example process 400 may begin at block 402, where content may be received (e.g., by the communication module 226). Example content may include books, other text, videos, audio, etc. The content may include events and objects, which may include characters, places, etc.

Relationships associated with the objects may be stored (e.g., by the relationship encoding module 236) at block 404. To facilitate the storing, relationships in the content may be determined (e.g., by the object determination module 230) at block 406. Example relationships may relate family members, territories in a region, events on a timeline, accomplishments by a character or other entity, etc. In one embodiment, relationships between objects may be determined by implementing an algorithm or other technique. As described above, an algorithm may utilize one or more classifiers, which may include rules, criteria, and context clues to facilitate identifying portions of the content, such as a sentence or phrase.

After such identification, objects may be identified within the portions according to certain rules or criteria, such as proximity to an event in the portion, number of references to the event in association with the objects, etc., as described above. A location in the content for the relationship between objects may also be determined (e.g., by the object determination module 230) at block 408. As described above, one or more positions in the content at which the relationship exists may be determined and stored. An example format for storing relationship information may be the object information 142 in FIG. 1. Various other formats recognizable to a reader device (e.g., the reader device 240 in FIG. 2) may be used in other embodiments.

At block 410, the relationship information may be modified. In one embodiment, a modification to the relationship information may be received from a third party device (e.g., the third party device 270 in FIG. 2) associated with a user, such as an author of the content, at block 412. The determined relationship information may be referred to herein as a recommendation in the way that the information may be confirmed or reviewed by such a user.

In certain embodiments herein, a user of the third party device may modify the relationships in instances in which the object determination module 230 determined relationships between objects. For example, the user may correct information for presumed relationships, as described above. The user may also, or alternatively, add relationship information. For example, the user may add relationship information in instances in which a device, such as the content source device 210, did not determine relationships in the content. In one embodiment, relationship information that is modified by a user may receive a score that is higher than the threshold to indicate a relatively high probability that such relationship information is correct.

The determined relationships may be scored (e.g., by the relationship scoring module 234) at block 414. Various factors may be used to determine the score, such as those described above. If the score exceeds a threshold value at block 416, then the content and the relationship information (which may be embedded in the content or otherwise associated with the content using metadata, sidecars, etc.) may be sent to a reader device at block 418. If the relationship score does not exceed the threshold value, at block 412, then processing may end. In certain embodiments herein, each relationship identified in the content may be scored and compared to a threshold value to determine whether information associated with the relationship should be sent to the reader device, in one embodiment.

A modification to the relationship information may be received from the reader device at block 420. As described, a user of the content may report errors in the relationship information. A model for determining relationships between the objects (e.g., the relationship training module 240) may be updated at block 422 based on the modification, in one embodiment.

Figure 5:
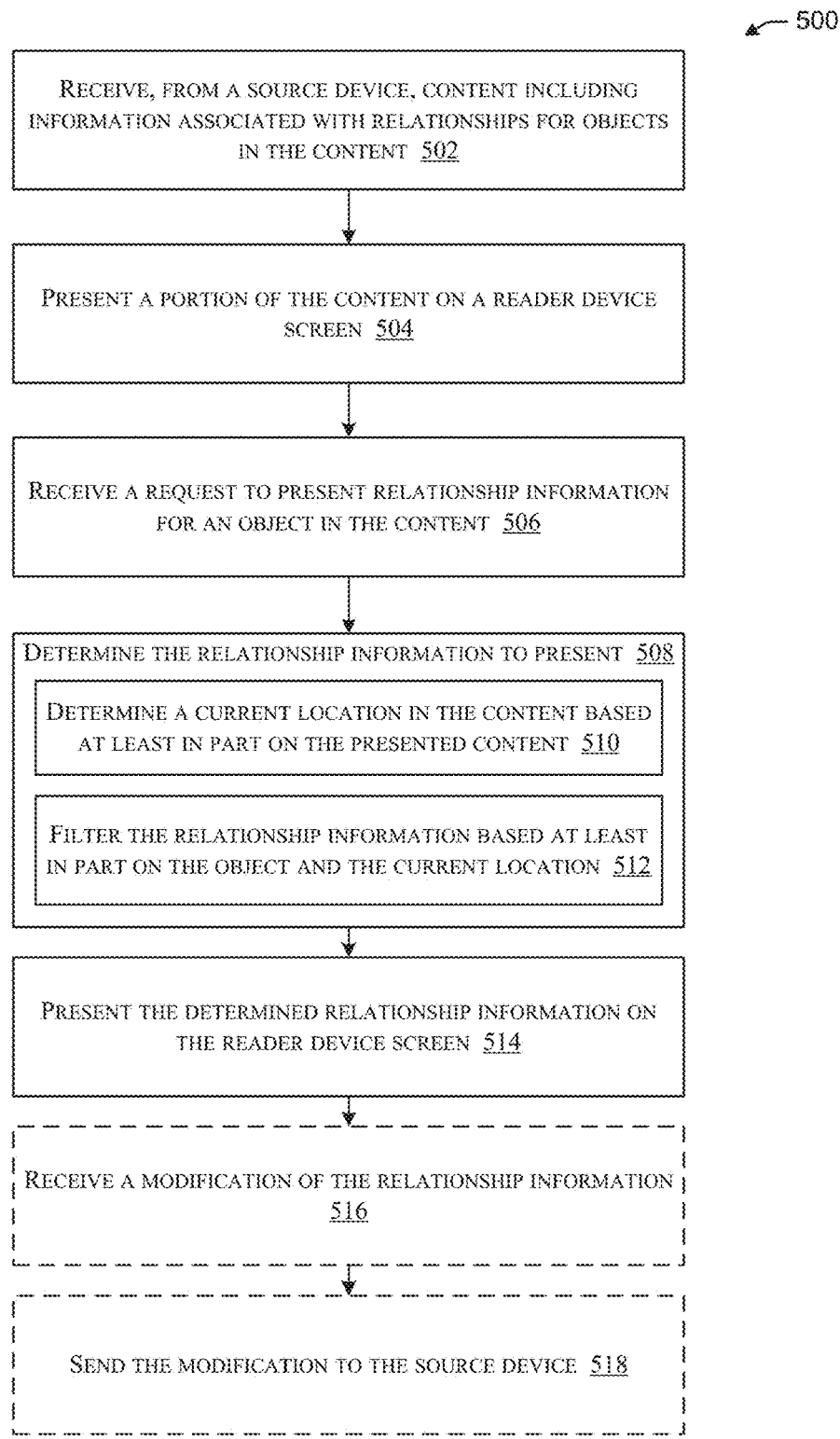
FIG. 5 depicts a flow diagram of an example process for displaying relationship information based on a current location in content, according to an embodiment of the disclosure.

FIG. 5 depicts a flow diagram of an example process 500 for displaying relationship information based on a current location in content, according to an embodiment of the disclosure. The example process 500 may be performed by the reader device 240 in FIG. 2, in one embodiment. The example process 500 may begin at block 502, where content and information associated with relationships between objects in the content may be received. In embodiment, the information associated with relationships between objects may be attached to, or otherwise associated with, the content. At least a portion of the content may be displayed at the reader device (e.g., by the display module 256) at block 504. In one example, the content may be a story for a book, and one page at a time of the book may be displayed on a screen of the reader device.

At block 506, a request to display relationship information for an object may be received. In one embodiment, the request may include an indication of a format of information structure desired for presentation the relationship information. For example, a user may request to view a family tree for a particular character in a story. As another example, a user may request to view a timeline of events related to a character in a story. As yet another example, a user may request to view a map of territories associated with a particular entity. Other examples exist.

Relationship information to display may be determined (e.g., by the display module 256) at block 508. Such a determination may include determining a current location in the content at block 510. The current location may be a position in the content. For example, each word in a book may have its own unique position. In this example, a current location may be the position of the last word displayed on a screen of the reader device. As described herein, relationship information beyond such a range may not be displayed to a user to prevent spoiling future information that has not yet been displayed to the user.

The relationship information may be filtered from the total relationship information associated with the received content at block 512. The filtering, or more generally the determination, may be based at least in part on the object for which information was requested, the indicated format or association technique for displaying the relationship information (e.g., a family tree, a timeline, a map, a biography, etc.), and the determined current location in the content.

The determined relationship information may be displayed on a screen of the reader device (e.g., by the display module 256) at block 514. Displaying the relationship information may include generating the requested format (e.g., family tree, timeline, map, etc.) and associating the objects with the format. Information associated with the objects may also be indicated in the format, in one embodiment.

A modification to the relationship information may be received (e.g., by the reporting module 258) at block 516. In one embodiment, the modification may include a correction of actual relationship information sent to the reader device. In another embodiment, the modification may include an indication that at least a portion of the relationship information is incorrect. In these embodiments, the indication may include an identification of an object, event, and/or location in the content, as well as a correction of any of these identifications. In this way, one or more modifications to relationship information may be received from a user of the reader device upon the user viewing an error in the relationship information. At block 518, the modification may be sent to a source device (e.g., the content source device 210 in FIG. 2), where the updates may be used to update a training model for determining relationships between objects in content.

The operations and processes described and shown above may be carried out or performed in any suitable order as desired in various implementations. Additionally, in certain implementations, at least a portion of the operations may be carried out in parallel. Furthermore, in certain implementations, less than or more than the operations described above may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a descriptive sense only and not for purposes of limitation.

What is claimed is:

1. A method comprising:

receiving, by a source device comprising at least one processor, an electronic book ("eBook") comprising a story including a first character having a first character name;

identifying, by the source device, a match between a keyword and a first word in the eBook;

determining, by the source device, a bookmarked location in the eBook, wherein the bookmarked location indicates a current reading location in the eBook;

determining, by the source device, an occurrence relating the first character name to the first word;

determining, by the source device, a number of words between the first character name and the first word in the eBook;

determining, by the source device, that the number of words between the first character name and the first word in the eBook is less than a threshold number of words;

determining, by the source device, a connection score for the first character and the first word in the eBook, wherein the connection score is based at least in part on the occurrence;

determining, by the source device and based at least in part on the connection score, that the first character is connected to the first word;

identifying, by the source device, that a second character is connected to the first word;

generating, by the source device and based at least in part on the number of words between the first character name and the first word in the eBook being less than the threshold number of words, data that represents a family structure including a parental relationship between the first character and the second character; and sending, by the source device, the eBook and the data representing the family structure to a reader device.

2. The method of claim 1, wherein the eBook comprises a first eBook and the story comprises a first story, and wherein the method further comprises:

receiving, by the source device, a modification to the family structure, wherein the modification to the family structure indicates a change from the first character being a parent of the second character to the first character being a guardian of the second character;

generating, by the source device, a training model using at least a portion of the modification to the family structure;

receiving, by the source device, a second eBook comprising a second story including the first character; and identifying, by the source device using the training model, that the first character in the second eBook is the guardian of the second character.

3. The method of claim 1, further comprising:

generating, by the source device, first data that represents a timeline structure including a date in the eBook on which the first character has a connection to the first word, and a location of the connection in the eBook;

generating, by the source device, second data that represents a biography structure including a description of the connection between the first character, the first word, and the location of the connection in the eBook; and sending, by the source device, the second data to the reader device, wherein the reader device:
 receives a request to display the description of the connection between the first character and the first word;
 determines the bookmarked location in the eBook;
 determines that the bookmarked location occurs before the location of the description; and
 prevents access to the description.

4. The method of claim 3, wherein the request comprises a first request, the eBook comprises first content, and the bookmarked location comprises a first bookmarked location, and wherein the reader device further:
 receives a second request to display the description of the connection between the first content and the first word;
 determines a second bookmarked location in the eBook;
 determines that the second bookmarked location occurs after the location of the description; and
 displays the description on a display of the reader device.

5. A device comprising:
 memory; and
 at least one processor, wherein the at least one processor is configured to execute computer-executable instructions in the memory to:
  determine a bookmarked location in content, wherein the bookmarked location indicates a current reading location in the content;
  determine an occurrence relating an object in the content to a first word in the content;
  determine a number of words between the object and the first word in the content;
  determine that the number of words between the object and the first word in the content is less than a threshold number of words;
  display a portion of the content on a screen of the device;
  receive a request to display a portion of relationship information for the object according to an information structure comprising at least one of a family structure, a timeline structure, a map structure, or a biography structure, the request comprising an identification of the information structure; and
  determine, based at least in part on the number of words between the object and the first word in the content being less than the threshold number of words, a relationship of the object and a location of the relationship in the relationship information that corresponds to the bookmarked location in the content.

6. The device of claim 5, the at least one processor further configured to execute the computer-executable instructions to:
 associate the relationship with the information structure; and
 display the relationship in association with the information structure on the screen of the device.

7. The device of claim 5, wherein the portion of the content comprises a first portion and the relationship comprises a first relationship, and wherein the at least one processor is further configured to execute the computer-executable instructions to:
 display, on the screen of the device, a second portion of the content that occurs after the first portion of the content;
 determine a second relationship at a location in the content that occurs after the first portion of the content and before a location of the second portion of the content; and
 display the first and the second relationship in association with the information structure on the screen of the device.

8. The device of claim 5, the at least one processor further configured to:
 determine at least a portion of the relationship information that comprises an identification of the object, an identification of the information structure, and one or more locations in the content that occur before the bookmarked location of the displayed portion of the content.

9. The device of claim 5, wherein the object comprises a first character in a story, the at least one processor further configured to execute the computer-executable instructions to:
 determine that the relationship information indicates a relationship between the first character and a second character in the story;
 determine that the relationship information further indicates a relationship between the first character and an event; and
 display the first character, the second character, and the event on the information structure comprising at least one of a family tree or a timeline.

10. The device of claim 5, wherein the object comprises an entity, the at least one processor further configured to execute the computer-executable instructions to:
 determine that the relationship information indicates a relationship between the entity and one or more geographical areas; and
 display the one or more geographical areas in association with the entity on the information structure comprising a map.

11. The device of claim 5, wherein the relationship information comprises first relationship information, and wherein the at least one processor is further configured to execute the computer-executable instructions to:
 receive an input that generates second relationship information from the first relationship information; and
 send the second relationship information to a remote device over a network.

12. The device of claim 5, wherein the relationship information is included in a sidecar file or metadata associated with the content, wherein the content comprises at least one of text, video, or audio.

13. A method comprising:
receiving, by a source device comprising at least one processor, content comprising a plurality of objects;
determining, by the source device, that a keyword matches an event in the content;
determining, by the source device, a relationship between an object of the plurality of objects and the event using (i) a number of words between the object and the keyword corresponding to the event and (ii) a number of instances the object appears in connection with the keyword corresponding to the event;
determining, by the source device, that the number of words between the object and the keyword in the content is less than a threshold number of words;
determining, by the source device, a bookmarked location in the content, wherein the bookmarked location indicates a current reading location in the content;
determining, by the source device, a first instance of the number of instances, wherein the first instance relates the object to the event;
determining, by the source device, a connection score for the object and the event, wherein the connection score is based at least in part on the first instance;
determining, by the source device, a location in the content associated with a second instance of the number of instances, wherein the location comprises at least one of a first position in the content associated with the object and a second position in the content associated with the event; and
generating, by the source device and based at least in part on the number of words between the object and the keyword in the content being less than the threshold number of words, relationship information in association with the content, wherein the relationship information comprises an object identification of the object, an event identification of the event, and at least one of the bookmarked location or the location.

14. The method of claim 13, wherein the relationship information is generated when the connection score exceeds a predetermined threshold.

15. The method of claim 13, further comprising:
determining, by the source device, an information structure for associating the object with the event using the keyword; and
storing, by the source device, an indication of the information structure in the relationship information.

16. The method of claim 13, further comprising:
storing, by the source device, the relationship information in a sidecar file or metadata associated with the content; and
sending, by the source device, (i) the content and (ii) the sidecar file or the metadata to a reader device.

17. The method of claim 13, wherein the content comprises a story and the object comprises a first character in the story, the method further comprising:
storing, by the source device, the first character and the event in connection with an information structure that comprises a timeline; and
storing, by the source device, the first character and a second character in the story related to the first character in connection with an information structure that comprises a family structure.

18. The method of claim 13, wherein the object comprises a first object, and the method further comprises:
determining, by the source device, that a second object is related to the first object; and
storing, by the source device, information associated with the second object in the relationship information comprising an object identification of the first object.

19. The method of claim 13, wherein the content comprises first content, the relationship between the object and the event comprises a first relationship, and wherein the method further comprises:
receiving, by the source device, a modification to the relationship information, wherein the modification to the relationship information indicates a change from the first relationship to a second relationship between the object and the event;
generating, by the source device, a training model using at least a portion of the modification to the relationship information;
receiving, by the source device, second content comprising the object and the event; and
identifying, by the source device using the training model, that the object has the second relationship with the event.

20. The method of claim 13, wherein the object comprises an entity, and wherein the method further comprises:
determining, by the source device, that the relationship information indicates a relationship between the entity and one or more geographical areas; and
display the one or more geographical areas in association with the entity on an information structure comprising a map.

* * * * *